Jan. 20, 1959     R. S. MOSHER     2,869,139
LINKAGE
Filed Sept. 7, 1956
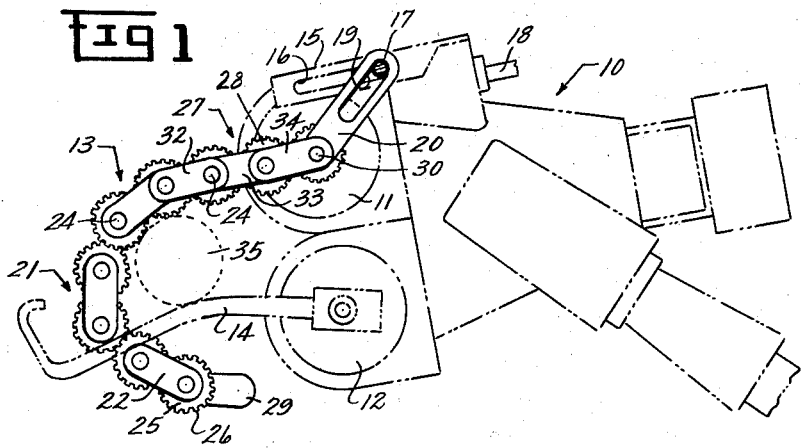
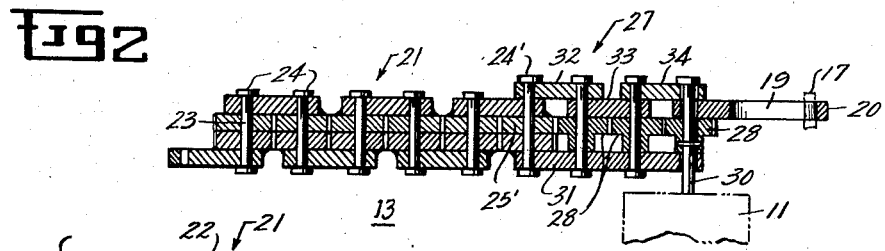
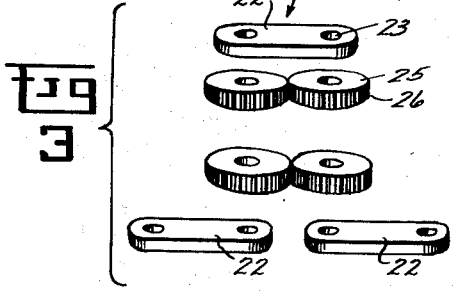
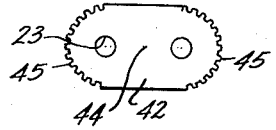
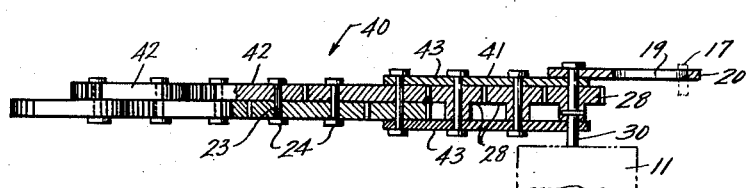
INVENTOR.
RALPH S. MOSHER
BY
Paul R. Webb, II
HIS ATTORNEY—

United States Patent Office 2,869,139
Patented Jan. 20, 1959

2,869,139

LINKAGE

Ralph S. Mosher, Schenectady, N. Y., assignor to General Electric Company, a corporation of New York Application September 7, 1956, Serial No. 608,589

6 Claims. (Cl. 3—12)

My invention relates to linkages and more particularly to linkages in which adjacent link members are in operative engagement.

A linkage in which both direction and position of individual link members is controlled in relation to the linkage is desirable, for example, in finger or joint construction in a robot or in an artificial hand. Additionally, it is also desirable to have an articulating linkage with surfaces which engage an object firmly. A sprocket type linkage consists of a number of pivoted links in a flexible chain in which individual links are not in engagement with each other and do not provide gripping surfaces with their flat sides. The invention of the present application provides an improved linkage in which adjacent link members are in operative engagement and produce gripping surfaces for holding objects securely.

Accordingly, it is an object of my invention to provide an improved linkage.

It is another object of the invention to provide an improved linkage in which adjacent link members are in operative engagement.

It is another object of the invention to provide an improved linkage in which individual link members provide gripping surfaces to hold objects.

It is a further object of the invention to provide an improved linkage in which the position of the linkage can be adjusted in relation to another surface to accommodate various size objects.

In carrying out my invention in one form, a series of link members are connected pivotally one to the other and are in operative engagement to provide a linkage.

These and various other objects, features and advantages of the invention will be better understood from the following description taken in connection with the accompanying drawing in which:

Figure 1 is a top plan view of a linkage embodying my invention which is shown connected to a robot hand;

Figure 2 is a sectional view of the linkage which is shown in Figure 1;

Figure 3 is an exploded view of a portion of the linkage which is shown in Figure 1;

Figure 4 is a sectional view of a modified linkage; and

Figure 5 is a top plan view of an individual link member which is shown in the linkage in Figure 4.

In Fig. 1 of the drawing, a robot hand is shown generally at 10 which includes a pair of driving motors 11 and 12 to actuate both linkage 13 of the present invention and a gripping hook 14, respectively. Hand 10 includes a member 15 with a slot 16 therein in which a pin 17 is slidable in response to mechanical, electrical or hydraulic actuation through a suitable connector 18. Pin 17 slides in a similar slot 19 in a support member 20 of linkage 13 to adjust the position of member 20. This adjustment determines the position of linkage 13 in relation to another surface, such as, hook 14 to accommodate objects of various sizes therebetween. Linkage 13 comprises a plurality of link members 21 each of which has a link bar 22 with a pair of apertures 23 in which rivets or pin 24 are positioned and a pair of gears 25 with teeth 26. Gears 25 are welded to link bar 22 and each pair of gears 25 can also be welded together. A main link member 27 with idler gears 28 forms the fixed end of linkage 13. At opposite end of linkage 13, an extension link member 29 provides additional gripping for an object when it is necessary.

As is best shown in Fig. 2, linkage 13 is connected with motor 11 by means of a shaft 30 which drives idler gears 28 to pivot link members 21 on their respective rivets 24. Main link member 27 comprises a bar 31 and spaced, opposed bars 32, 33 and 34 which are held in position by similar rivets 24. Three idler gears 28 are shown as located within main link member 27 on adjacent rivets 24. Support member 20 is affixed to main link member 27 between first idler gear 28 and bar 34. Link members 21 are arranged in an alternate, opposed manner and held pivotally together by their respective rivets 24 which are positioned in common connecting apertures 23. Main link member 27 and link members 21 are connected pivotally together by a rivet 24'. Gear 25' of first link member 21 engages operatively the last idler gear 28 as by meshing of teeth 26 on gear 25' with similar teeth on wheel 28.

Fig. 3 discloses an exploded view of a link member 21 and associated portions of two opposed link members. Each link member 21 has a link bar 22 with a pair of apertures 23 therein and a pair of gears 25 with teeth 26 which gears are affixed to link bar 22 by welding. Teeth 26 which are adjacent the ends of each link bar 22 provide surfaces which mesh with adjacent teeth on other link members in the linkage while the use of a pair of gears 25 provides additional teeth for gripping an object.

In the operation of linkage 13 which is shown in Figs. 1 and 2, main link member 27 is attached to motor 11 by shaft 30 and is held in a fixed position by support member 20 which is engaged with member 15 by pin 17. Thus, linkage 13 is in a fixed position at its main link member end while the opposite end of linkage 13 is movable to grip an object 35. While support member 20 could be affixed to member 15 by means of a bolt or in a similar manner and adjusted manually to change the position of linkage 13, it is preferred to accomplish this adjustment automatically through use of pin 17 and connector 18. Since each link member 21 comprises a link bar 22 with a pair of gears 25 welded thereto, link member 21 pivots as a unit an equal amount with respect to its preceding link member. Motor 11 drives shaft 30 which turns idler gears 28 on main link member 27. Third gear 28 in the idler gear series meshes with gear 25' of first link member 21 which causes this link to pivot about the axis of rivet 24'. The other link members 21 pivot in a similar fashion causing linkage 13 to curl in the manner which is shown in Figure 1. Thus, linkage 13 encircles object 35 to hold the object against hook 14 while gear teeth 26 provide additional gripping surface. When it is desired to release object 35, shaft 30 is rotated in reverse direction by motor 11, whereby link members 21 pivot in the opposite direction. Thus, the embodiment of my invention shown in Figs. 1–3 discloses a linkage in which adjacent link members are in operative engagement to provide controllable linkage direction and position.

In Figs. 4 and 5 of the drawing, a modified linkage 40 is shown supported on a motor 11 and driven by shaft 30. Linkage 40 comprises a support member 20, a main link member 41, and a plurality of link members 42. Main link member 41 comprises a pair of spaced, opposed bars 43 which are held in position by rivets 24 in common apertures 23. Three idler gears 28 are located between bars 43 on adjacent rivets 24. Support member 20 is affixed to main link member 41 between the head of a rivet 24 and bar 41. Link members 42 are arranged in an alternate, opposed manner and held together pivotally by their respective rivets 24 which are positioned in common connecting apertures 23. As is best shown in Fig. 5, each link member 42 comprises a link bar portion 44, teeth 45 at opposite end of portion 44, and a pair of apertures 23 in portion 44 to provide openings for rivets 24. Link members 42 are connected to main link member 41 by a rivet 24. While link members 42 are shown with flat sides for gripping surfaces these flat sides can be recessed or teeth 45 can be continued around the entire periphery of each link member. Linkage 40 operates in the same manner as linkage 13.

As will be apparent to those skilled in the art, the objects of my invention are attained by the use of a series of link members which are connected pivotally one to the other and are in operative engagement to provide an articulating linkage.

While other modifications of this invention and variations of apparatus which may be employed within the scope of the invention have not been described, the invention is intended to include all such as may be embraced within the following claims.

What I claim as new and desire to secure by Letters Patent of the United States is:

1. A linkage comprising a main link member, means for securing said main link member in a fixed position, a series of link members connected pivotally one to the other and to said main link member, each of said link members comprising a link bar, a pair of gears affixed to said link bar, a plurality of teeth around at least a portion of the periphery of each of said gears, each pair of said gears operatively engaging an associated pair of gears, and driving means engaging said pairs of gears.

2. A linkage comprising a main link member, means for securing said main link member in a fixed position, a series of link members connected pivotally one to the other and to said main link member, each of said members comprising a link bar portion, a plurality of teeth at opposite ends of each of said link bar portions, each of said link members operatively engaging an associated link member, and driving means engaging said link members.

3. In a linkage, a series of link members connected pivotally one to the other, each of said link members comprising a link bar, a pair of gears affixed to said link bar, a plurality of teeth around at least a portion of the periphery of each of said gears, each pair of said gears operatively engaging an associated pair of gears.

4. In a linkage, a series of link members connected pivotally one to the other, each of said members comprising a link bar portion, a plurality of teeth at opposite ends of each of said link bar portions, and each of said link members operatively engaging an associated link member.

5. A linkage comprising a main link member, means for securing said main link member in a fixed position, a series of link members connected pivotally one to the other and to said main link member, each of said link members comprising a link bar, a pair of gears affixed to said link bar, a plurality of teeth around at least a portion of the periphery of each of said gears, and each pair of said gears operatively engaging an associated pair of gears.

6. A linkage comprising a main link member, means for securing said main link member in a fixed position, a series of link members arranged in an alternate, opposed manner, said link members connected pivotally one to the other and to said main link member, each of said link members comprising a link bar, a pair of gears affixed to said link bar, a plurality of teeth around at least a portion of the periphery of each of said gears, and each pair of said gears operatively engaging an associated pair of gears.

References Cited in the file of this patent

UNITED STATES PATENTS

| | | |
|---|---|---|
| 1,507,681 | Pecorella et al. | Sept. 9, 1924 |
| 2,335,455 | Scott | Nov. 30, 1943 |
| 2,639,437 | Harry | May 26, 1953 |